3,429,748
FUEL CELLS WITH MEANS TO EXHAUST GAS FROM ELECTRODE EDGE
Anthony J. Stankavich, Syracuse, and Thomas E. Geckle, Liverpool, N.Y., assignors to Carrier Corporation, Syracuse, N.Y., a corporation of Delaware
Filed May 12, 1965, Ser. No. 455,128
U.S. Cl. 136—86       16 Claims
Int. Cl. H01m 27/04

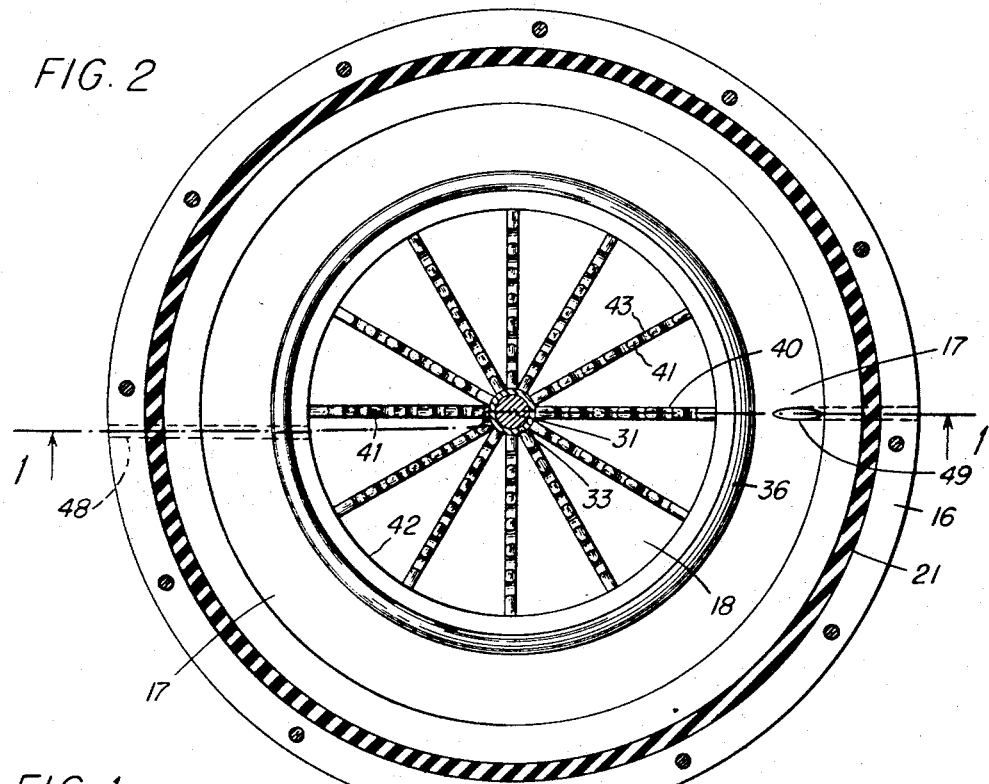
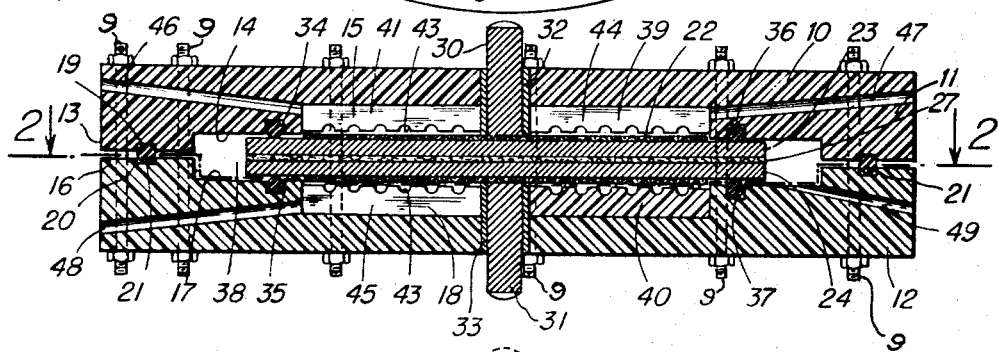
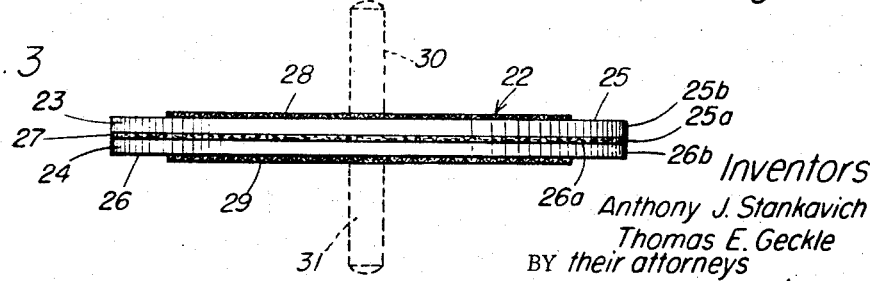
Inventors
Anthony J. Stankavich
Thomas E. Geckle
BY their attorneys Inventors
Anthony J. Stankavich
Thomas E. Geckle
By their attorneys
Howson and Howson United States Patent Office 3,429,748
Patented Feb. 25, 1969

ABSTRACT OF THE DISCLOSURE

A sealed fuel cell utilizing gas permeable electrodes separating reactant fuel and oxidant from liquid electrolyte maintains higher terminal voltage under load by virtue of venting exhaust gas from the edge of the electrodes.

---

This invention relates to fuel cells and in particular to the type of fuel cells in which a reactant gas penetrates a permeable electrode to contact a liquid electrolyte. More specifically the invention relates to a novel cell structure by means of which the performance of such cells can be improved.

Fuel cells are electrochemical devices for converting the chemical energy of a fuel directly into electrical energy. In the class of fuel cells with which the present invention is concerned, a reactant gas is furnished to one extended surface of a flat porous electrode. A liquid electrolyte is furnished to the opposite surface of the electrode and is absorbed in and on the porous structure. The gas penetrates the electrode and coming into contact with absorbed electrolyte, undergoes a reaction involving the transfer of electrons. An opposite reaction is simultaneously carried out at an opposing electrode in contact with the same electrolyte and when the two electrodes are connected in an external circuit a current is obtained.

One of the requirements for successful design of a fuel cell is that the terminal voltage of the cell remain high as the cell is loaded, i.e., as the current per unit area of electrode is increased. There is always some drop in this voltage, but for obvious reasons it is desirable to minimize the drop.

In operating cells of the class described, the gas must be able to penetrate the electrode, and therefore must be under a certain pressure. If the electrode and the liquid electrolyte (normally present in an inert, solid carrier), are left open to the atmosphere, liquid electrolyte is sprayed about by the pressurized gas, raising practical operating problems. If, however, the cell is sealed to the atmosphere to avoid spraying, it is found that the performance of the cell, with respect to terminal voltage and power output with increasing demand, is adversely affected.

It is an object of the invention to provide a fuel cell of the type described which is compact, clean in operation and of high performance.

It is another object of the invention to provide a fuel cell of the class described in which the terminal voltage is maintained at a high level with increasing current density.

It is another object of the invention to provide a fuel cell of the type described in which power density increases at a high rate with increasing current density over a wide range of current densities.

It is another object of the invention to provide a structure for a fuel cell which assures that reactants and electrolyte flow continuously through the appropriate electrodes, with the result that the electrical output of the cell is maintatined under conditions of high current drain.

Other objects will become clear from a consideration of the following specification and claims.

In accordance with the invention the recited objects and others are met by a fuel cell having a gas permeable electrode with two extended surfaces and a narrow edge, one of said surfaces being in contact with a liquid electrolyte, means for supplying a reactant gas to substantially the entire other extended surface and vent means for removing gas from the edge of the electrode.

More specifically the invention envisions a fuel cell having a casing, a gas permeable electrode with two extended surfaces and a narrow edge in said casing, an electrolyte in a porous electrolyte carrier, said carrier having an edge, and a surface in contact with one extended surface of said electrode, feed means in said casing for furnishing a reactant gas to substantially the entire other extended surface of the electrode and vent means in said casing for removing gas from the edges of said electrode and said electrolyte carrier and from the interface between the electrode and the electrolyte carrier.

In the drawings:

FIG. 1 is a view in vertical section of a fuel cell according to the invention;

FIG. 2 is a plan view of one section of a fuel cell casing in accordance with the invention, the view being taken along the line 2—2 of FIG. 1;

FIG. 3 is a view in elevation of an electrode assembly for use in the fuel cells of FIGS. 1 and 2.

Figure 4:
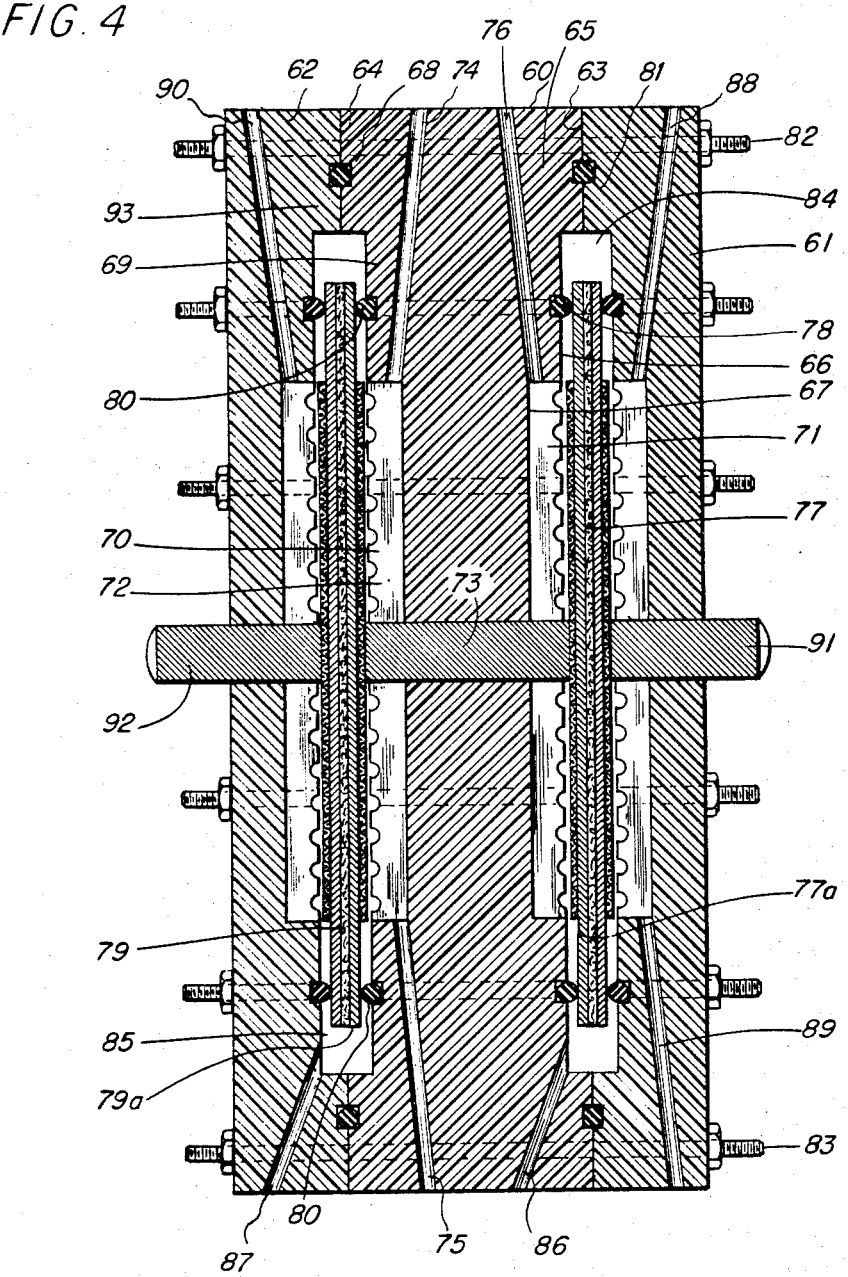
FIG. 4 is a view in vertical section of a battery of two cells according to the invention.

In the detailed description which follows, the invention will be described in connection with a fuel cell employing a liquid fuel mixture, specifically hydrazine dissolved in aqueous potassium hydroxide electrolyte, and a gaseous oxidant, specifically oxygen. It will be understood, however, this description is given for purposes of illustration only and that the invention is capable of employment with other fuels and other oxidants.

Referring to the drawing a cell in accordance with the invention comprises a casing 10 having a fuel section 11 and an oxidant section 12. Each section is dish-shaped. The fuel section has a peripheral outer rim 13, a depressed shelf 14 inwardly of the rim 13 and a central cavity 15 inwardly of said shelf. Similarly, the oxidant section 12 has a peripheral outer rim 16, a depressed shelf 17 inwardly of said outer rim 16, and a central cavity 18. When assembled, the peripheral rims of the two sections abut one another. Annular recesses 19 and 20 are provided in the rims 13 and 16, respectively, to receive a sealing ring 21, made, for example, of natural or synthetic rubber, which insures that the junction between the abutting rims 13 and 16 is gas and liquid tight.

In the hollow interior of the casing 10 is located an electrode assembly 22. Various electrode designs are possible, and the specific construction of the porous electrode is not a part of the present invention. Features of the particular electrode assembly shown in the drawings and referred to herein are disclosed and claimed in our copending application Ser. No. 455,134, filed May 12, 1965.

The electrode assembly 22 is shown more clearly in FIG. 3. Referring to that figure, the assembly comprises a fuel electrode 23 and an oxidant electrode 24. The fuel electrode may be made in accordance with any one of several known techniques. Normally it will comprise a suitable porous support such as a nickel plaque, treated to improve its catalytic properties.

The oxidant electrode 24 is preferably a porous nickel plaque in the pores of which silver has been deposited.

The fuel electrode 23 is disc-shaped and has two extended surfaces 25 and 25a, and a narrow edge 25b. The oxidant electrode 24 is similarly shaped and has two extended surfaces 26 and 26a and a narrow edge 26b. It will be understood that for clarity the proportions shown in the drawings have been exaggerated, in that the electrodes are much thicker in the drawing, relative to their surfaces, than is normally the case. For example, in a typical example, an electrode of 6½″ diameter is 0.05″ thick.

In accordance with the teachings of our copending application Ser. No. 455,134, either or both electrodes may have screens pressed into their outer surfaces 25 and 26. This is not shown in the drawing.

Between the two electrodes 23 and 24, is an electrolyte carrier 27. This is made of a porous, chemically inert material. A microporous asbestos mat has been found suitable.

Current collectors 28 and 29 are pressed against the surfaces 25 and 26 of electrodes 23 and 24 to facilitate the flow of current from the individual reaction sites in the electrodes where electrons are released or received across the faces of the electrodes. These collectors are simply screens suitably of nickel wire and are attached by any convenient means to studs 30 and 31. The studs are also made of a metal such as nickel having good corrosion resistance and conductivity.

As shown in FIG. 1, the electrode assembly 22 is seated on the shelves 14, 17 with the studs 30, 31 extending through sockets 32, 33 provided in the center of casing sections 11 and 12, respectively. The shelves 14 and 17 are provided with annular recesses 34, 35 for receiving sealing rings 36, 37. These sealings rings bear against the outer parts of electrodes 23 and 24, respectively, which may be compressed, prior to assembling the cell, to give a smooth even surface and thus to facilitate sections of sealing rings 36, 37. The electrode assembly, it will be observed, does not extend radially as far as the rims 13, 14 and the space between the edge of the electrode assembly and the inner walls of the rims 13 and 14 constitutes an annular vent chamber 38.

The depressed central cavities 15 and 18 of the casing sections 11 and 12 are furnished with supporting elements 39, 40. As may best be seen in FIG. 2, these are spider-like structures having a plurality of arms such as 41 extending radially from the central socket 33 to the inner wall 42 of the central cavity 18. Each arm such as 41, has a plurality of notches such as 43 so that fluid introduced into any part of the central cavity may flow circumferentially as well as radially and thus be freely accessible to substantially the entire area of the associated electrode.

It will be observed that the sealing ring 34 effectively seals the central cavity 15 of the fuel section 11 from the vent chamber 38 and forms a sealed fuel receiving chamber 44 defined by the fuel electrode 23 and the walls of the central cavity 15.

Similarly, the sealing ring 36 effectively seals the central cavity 18 of the oxidant section 12 from the vent chamber 38 and defines with the oxidant electrode 24 an oxidant gas receiving chamber 45.

A fuel mixture is brought into the fuel receiving chamber 44 through a duct 46 and an exhaust mixture is removed from the chamber 44 through a duct 47. An oxidant gas is furnished to the gas receiving chamber 45 through a duct 48. It will be observed, however, that there is no way for gas to escape from the chamber 45 except by flowing through the permeable gas electrode 24. Gas following this course can move radially through the electrode 24 and escape from the edge 26b into the annular vent chamber 38. Gas which has penetrated the entire thickness of the electrode can also move radially at the interface between electrode surface 26a and carrier 27 into the chamber 38. In accordance with the invention this gas and any entrained electrolyte may then be removed from chamber 38 through a duct 49, provided for that purpose.

In a typical operation the fuel cell is assembled as shown in FIG. 1 with the fuel section 11 and oxidant section 12 clamped tightly together by a clamp or through bolts, such as 9. The electrolyte carrier 27 is saturated with 30% aqueous KOH. A mixture of about 3.5% hydrazine and 30% KOH in water is supplied to the fuel receiving chamber 44 through duct 46. Oxygen or air is furnished to the gas receiving chamber 45 through duct 48 under a pressure of say 4 p.s.i.g. As the cell operates, a mixture of gas and entrained liquid is released through the duct 49. If desired, this may be connected to a trap for separation of the liquid and the gas may be recycled or vented to the atmosphere.

In the construction shown, the studs 30 and 31 serve as electrical terminals.

In the preceding description the construction of a single fuel cell has been described. The same principles can, of course, be applied to the construction of batteries having two or many more cells. One such battery is shown in FIG. 4.

Referring now to FIG. 4, a battery of cells is built up by combining one or more intermediate casing sections 60 with two terminal casing sections 61 and 62. The terminal sections 61 is identical with the fuel section 11 of FIG. 1 and the terminal section 62 is identical with the oxidant section 12 of FIGS. 1 and 2. The intermediate section 60 has an oxidant side 63 and a fuel side 64 and may be compared to an oxidant casing section and a fuel casing section, as shown in FIG. 1, placed back to back. Thus the oxidant side 63 has a peripheral rim 65, a depressed shelf 66 inwardly of the rim 65 and a central cavity 67 inwardly of the shelf 66. Similarly, the fuel side 64 has a peripheral rim 68, a depressed shelf 69 and a central cavity 70. The central cavities 67 and 70 of the two sides are furnished with supporting elements 71 and 72, respectively. In the center of the intermediate section 60 and extending from the fuel side to the oxidant side is a core 73 which is made of a highly conductive, corrosion resistant metal such as nickel. Where the intermediate casing section 60 is made of plastic, for example, this core may be molded integrally with the section.

The fuel side 64 of the intermediate casing section is provided with ducts 74 and 75 for introducing and removing fuel from the central cavity 70. Similarly the oxidant side 63 of the intermediate section has a duct 76 for introducing oxidant to the central cavity 67.

In the assembled battery, an electrode assembly 77, of the type described above in connection with FIG. 3, is seated on the shelf 66 of the oxidant side of the intermediate casing, and specifically on a sealing ring 78 provided in that shelf. Similarly an electrode assembly 79 is seated on a sealing ring 80 in the shelf 69 of the fuel side 64 of the intermediate section. The oxidant electrode 77a of the assembly 77 is next to the intermediate section and the fuel electrode 79a of the assembly 79 is adjacent the intermediate section. The terminal section 61 is placed with its peripheral rim 81 abutting the peripheral rim 65 of the intermediate section. Similarly the terminal section 62 is positioned with its peripheral rim 93 abutting the peripheral rim 68 of the intermediate section. The sections are maintained in this relationship by bolts such as 82, 83.

As in the embodiment of FIGS. 1 and 2, the electrode assemblies 77 and 79 do not extend radially to the peripheral rims of the casing sections, forming annular vent chambers 84 and 85 to receive gas and entrained liquid carried radially through the oxidant electrodes and electrolyte carriers. A vent duct 86 is provided in the oxidant side of the intermediate section 60 for removing this material from the chamber 84. A duct 87 in terminal casing section 62, identical to the duct 49 of FIG. 1, serves this purpose for the vent chamber 85.

The operation of the battery will be obvious from the description of FIGS. 1 to 3. Fuel-containing liquid is furnished to the duct 74 of the intermediate section 60 and the duct 88 of terminal section 61 and contacts the fuel electrodes of the electrode assemblies 79 and 77, respectively. Diluted fuel liquid is removed through duct 75 of the intermediate section 60 and through duct 89 of the terminal section 61. Oxidant gas is furnished to the duct 76 of the intermediate section and duct 90 of the terminal section 62, and contacts the oxidant electrodes of the electrode assemblies 77 and 79, respectively. Oxidant gas which has passed radially through the oxidant electrodes, and entrained electrolyte from the electrolyte carriers, are removed from vent chambers 84 and 85 by ducts 86 and 87, respectively, in the intermediate section 60 and terminal section 62. Current is drawn from the battery by means of the terminal studs 91 and 92.

It will be obvious to those skilled in the art that any number of intermediate sections such as 60 in FIG. 4 can be interposed between two terminal sections to form a battery.

Cells constructed in accordance with the invention show great improvement over cells in which the casing is not provided with a gas vent. Thus, for example, a typical hydrazine-oxygen cell where the oxidant section of the cell was not vented had a terminal voltage at zero load of 0.91 volt. Increasing the load to give a current density of 100 amps per square foot of electrode surface reduced the voltage to aout 0.2 volt for a power output of 20 watts per square foot. In contrast a similar cell according to the invention in which gas was permitted to flow radially through the oxidant electrode had a no-load terminal voltage of 0.91 volt and a voltage of 100 amps per square foot of 0.6 volt for a power output of 60 watts per square foot.

While the precise reasons for the greatly improved performance of cells made according to the invention have not been fully elucidated, it is considered that in a fully sealed cell the gas flows unevenly through the electrode, and entirely in a direction normal to the surface of the electrode. Some reaction sites, those associated with pores of small diameter, receive no gas, but on the contrary, are flooded by electrolyte drawn into the small pores by capillary action. Other sites, associated with large pores, receive little or not electrolyte. Since the reaction occurs at a catalytic surface at which liquid and gas coexist, thus irregular flow of gas results in reducing the effective area of the electrode.

In the structure according to the invention reactant gas is delivered over one whole extended surface of the electrode. It seeps into the porous electrode structure, moves radially through the electrode and leaves through the edge of the electrode. Gas which may pass through the entire electrode thickness moves radially to the annular vent chamber at the interface between the electrode and the electrolyte carrier. In either case the gas is delivered uniformly over the entire extended surface of the electrode and a steady state flow is set up from that surface through the electrode to the vent chamber. The low pressure resulting in a dynamic system of this nature avoids uneven distribution of gas through the electrode and the accompanying loss of activity in substantial areas of the electrode resulting therefrom.

In the case of a cell employing a liquid fuel, such as the hydrazine cell described above, this vent chamber also makes possible replenishment of the electrolyte absorbed by the microporous electrolyte carrier between the electrodes, which otherwise would dry out during operation of the cell.

What is claimed is:

1. A fuel cell having a gas permeable electrode with two extended surfaces and a porous narrow edge, means for supplying a reactant gas to one of said surfaces, an electrolyte in contact with the other surface and means for removing exhaust gas from the edge of the electrode and the periphery of the interface between the electrode and the electrolyte, the fuel cell being so constructed that substantially all of the reactant gas passes into said electrode and the exhaust is only from about the porous narrow edge of said electrode and from the periphery of said interface.

2. A fuel cell having a casing, a gas permeable electrode in said casing, said electrode having two extended surfaces and porous narrow edge, feed means in said casing for furnishing a reactant gas to one entire extended surface of said electrode and means in said casing for removing exhaust gas from the edge of said electrode, the fuel cell being so constructed that substantially all of the reactant gas passes into said electrode and the exhaust is only from about the porous narrow edge of said eletrode.

3. A fuel cell having a gas permeable electrode with two extended surfaces and a porous narrow edge, a liquid electrolyte in contact with one surface of said electrode, feed means for furnishing a reactant gas to the other surface of said electrode and exhaust gas vent means communicating with said edge and with the interface between said other electrode surface and said electrolyte, the fuel cell being so constructed that substantially all of the reactant gas passes into said electrode and the exhaust is only from about the porous narrow edge of said electrode and from the periphery of said interface.

4. The fuel cell claimed in claim 3 in which the vent means is sealed from communication with the feed means except through said porous electrode.

5. A fuel cell comprising a porous fuel electrode having two extended surfaces, a porous oxidant electrode having two extended surfaces and a porous narrow edge, a porous electrolyte carrier having extended surfaces and a narrow edge, said carrier containing liquid electrolyte, and being positioned between and in contact with one surface of each of said fuel and oxidant electrodes, means for supplying an oxidant gas to the other surface of said oxidant electrode, means for supplying a mixture of fuel and liquid electrolyte to the other surface of the fuel electrode and means for removing gas from the edges of said oxidant electrode and said carrier and from between the porous electrolyte carrier and the opposing surface of the oxidant electrode, the fuel cell being so constructed that substantially all of the oxidant gas passes into said oxidant electrode and the exhaust is only from about the porous narrow edges of said oxidant electrode and said electrolyte carrier.

6. A fuel cell comprising a casing, a gas permeable oxidant electrode having two extended surfaces and a porous narrow edge in said casing, a porous electrolyte carrier in contact with one surface of said electrode, a gas receiving chamber in said casing, substantially the entire other surface of the oxidant electrode being in free communication with said chamber, means for supplying reactant gas to said chamber, and vent means, sealed from said chamber, for removing gas from the edge of said electrode, the fuel cell being so constructed that substantially all of the reactant gas passes into said electrode and the exhaust is only from about the porous narrow edge of said electrode.

7. The fuel cell claimed in claim 6 and comprising means for supplying liquid electrolyte to said electrolyte carrier.

8. A fuel cell comprising a casing, a porous fuel electrode having two extended surfaces in said casing, a gas permeable oxidant electrode having two extended surfaces and a porous narrow edge in said casing, a porous electrolyte carrier having a narrow edge, positioned between said electrodes and in contact with one surface of each of said electrodes, a fuel receiving chamber in said casing, the other surface of said fuel electrode being in free communication with said fuel receiving chamber, a gas receiving chamber in said casing, the other surface of said oxidant electrode being in free communication with said gas receiving chamber, means for supplying fuel to said fuel receiving chamber, means for supplying oxidant gas to said gas receiving chamber, the cell being so constructed that substantially all of the oxidant gas passes into said oxidant electrode, and vent means, sealed from said gas receiving chamber, for removing gas only from the edges of said oxidant electrode and carrier and from the perimeter of the surface of said oxidant electrode in contact with said carrier.

9. The fuel cell claimed in claim 8 wherein the vent means comprises a vent chamber in communication with the edges of the oxidant electrode and carrier and with the interface between the oxidant electrode and the carrier, and duct means in said casing for removing gases from said vent chamber.

10. A fuel cell comprising a casing having a fuel section and oxidant section, each of said sections having a peripheral outer rim, a depressed shelf inwardly of said outer rim and a central cavity inwardly of said shelf, a flat, porous fuel electrode, having two extended surfaces, seated on the shelf of the fuel section, one surface of the fuel electrode being in communication with the central cavity of the fuel section, a flat gas permeable oxidant electrode, having a porous narrow edge and two extended surfaces, seated on the shelf of the oxidant section, one surface of the oxidant electrode being in communication with the central cavity of the oxidant section, a porous electrolyte carrier having a narrow edge interposed between the fuel and oxidant electrodes and in contact with the outer surfaces of said electrodes, means for supplying oxidant gas to the central cavity of the oxidant section, the cell being so constructed that substantially all of the oxidant gas passes into said oxidant electrode, means for supplying a liquid mixture of fuel and electrolyte to the central cavity of the fuel section and vent means, sealed from the central cavities of each of said sections, for removing gas only from the edges of the oxidant electrode and the carrier and from the interface between the oxidant electrode and the carrier.

11. The fuel cell claimed in claim 10 wherein the vent means comprises an annular vent chamber between the electrodes and the outer rims of the casing sections and sealed from the central cavities of said sections, and duct means in the oxidant section for removing gas from said vent chamber.

12. The fuel cell claimed in claim 11 wherein the vent chamber is sealed from the cavities by sealing rings seated in the shelves and bearing on the electrodes.

13. The fuel cell claimed in claim 10 wherein the outer rims of each of the sections abut one another, and comprising a sealing ring, seated in the rims.

14. A fuel battery comprising a plurality of fuel cells, each of said cells having a gas permeable electrode with two extended surfaces and a porous narrow edge, means for supplying a reactant gas to one of said surfaces, a liquid electrolyte in contact with the other surface and vent means for removing gas from the edge of the electrode and the interface between the electrode and the electrolyte, the fuel cell being so constructed that substantially all of the reactant gas passes into said electrode and the exhaust is only from about the porous narrow edge of said electrode and from the periphery of said interface.

15. A fuel battery having a plurality of fuel cells, said battery comprising a casing having two terminal sections and an intermediate section, each of said cells having a porous fuel electrode with two extended surfaces, a gas permeable oxidant electrode having two extended surfaces and a porous narrow edge, a porous electrolyte carrier having a narrow edge, positioned between said electrodes and in contact with one surface of each of said electrodes, a fuel receiving chamber, the other surface of said electrode being in free communication with said fuel receiving chamber, a gas receiving chamber, the other surface of said oxidant electrode being in free communication with said gas receiving chamber, means for supplying a fuel to said fuel receiving chamber, means for supplying oxidant gas to said gas receiving chamber, the cell being so constructed that substantially all of the oxidant gas passes into said oxidant electrode, and vent means sealed from said gas receiving chamber, for removing gas only from the edges of the oxidant electrode and carrier and from the perimeter of the interface between the oxidant electrode and the carrier.

16. The battery claimed in claim 15 wherein the intermediate section of the casing has a fuel side and an oxidant side, the gas receiving chamber for one of said cells being formed in said oxidant side of said intermediate section and the fuel receiving chamber for an adjacent cell being formed in said fuel side of said intermediate section.

References Cited

UNITED STATES PATENTS

| | | | |
|---|---|---|---|
| 2,070,612 | 2/1937 | Niederreither | 136—86 |
| 2,716,670 | 8/1955 | Bacon | 136—86 |
| 3,146,131 | 8/1964 | Linden et al. | 136—86 |
| 3,161,546 | 12/1964 | Yeager et al. | 136—86 |
| 3,236,692 | 2/1966 | Lewis | 136—86 |
| 3,043,898 | 7/1962 | Miller et al. | 136—86 |

ALLEN B. CURTIS, *Primary Examiner.*

U.S. Cl. X.R.

136—120